March 14, 1961 W. R. POLANIN 2,974,757
SELF-CONTAINED BRAKE ARRANGEMENT
Filed April 23, 1958 2 Sheets-Sheet 1

Witness:
Richard W. Carpenter

Inventor:
Walter R. Polanin
By Walter L. Schlegel, Jr.
Atty.

March 14, 1961   W. R. POLANIN   2,974,757
SELF-CONTAINED BRAKE ARRANGEMENT
Filed April 23, 1958   2 Sheets-Sheet 2
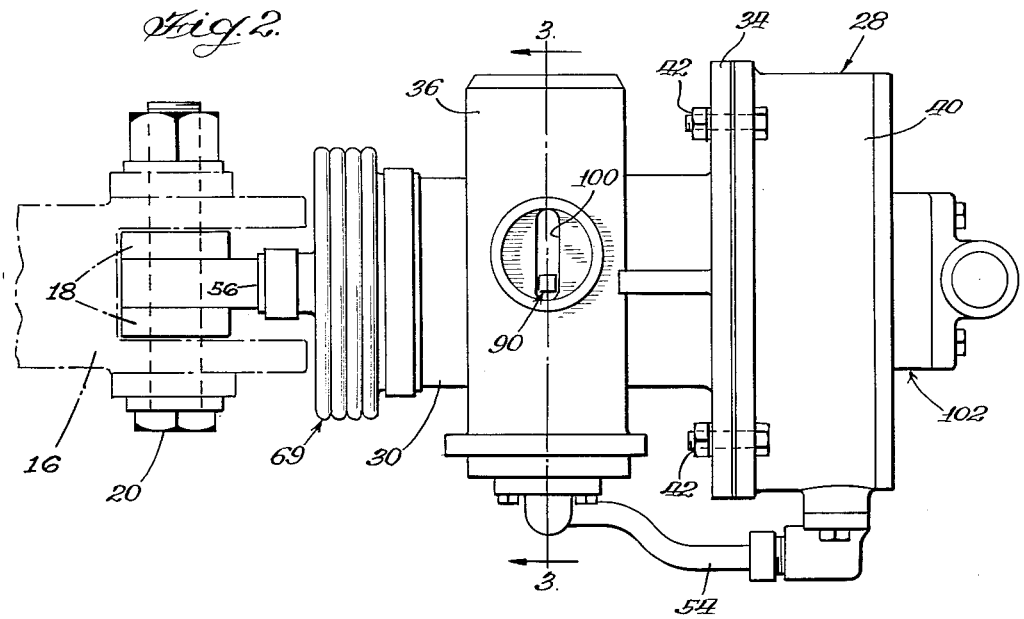
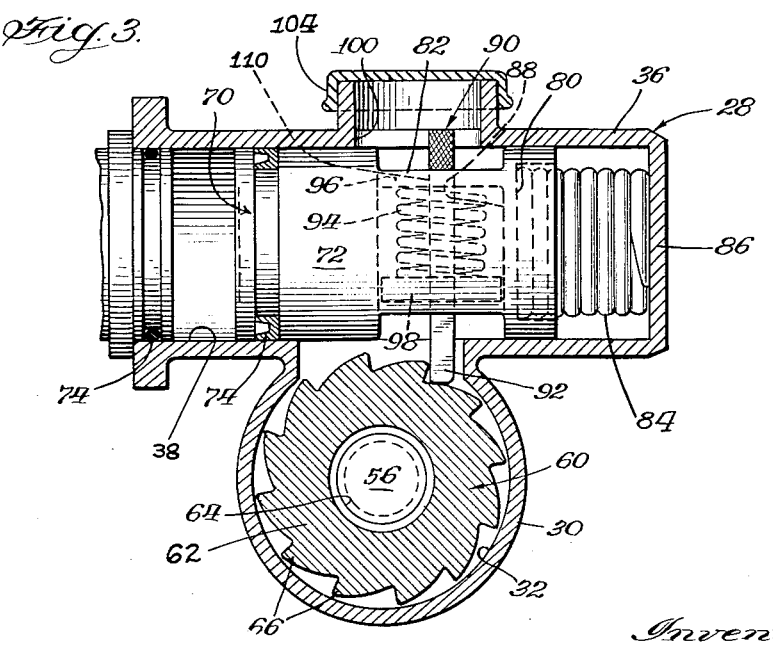
Inventor:
Walter R. Polanin
By Walter L. Schlegel, Jr.
Atty.
Witness:
Richard W. Carpenter

United States Patent Office 2,974,757
Patented Mar. 14, 1961

2,974,757

SELF-CONTAINED BRAKE ARRANGEMENT

Walter R. Polanin, Chicago, Ill., assignor to American Steel Foundries, Chicago, Ill., a corporation of New Jersey Filed Apr. 23, 1958, Ser. No. 730,353

1 Claim. (Cl. 188—203)

This invention relates to brakes and more particularly to a self-contained brake arrangement for a railway vehicle.

The invention comprehends a self-contained brake arrangement including a combination power cylinder-slack adjuster assembly.

It is an important object of this invention to provide an efficient brake actuating arrangement of relatively simple design and construction which is adapted to be readily secured to or detached from a railway vehicle frame as a self-contained brake mechanism.

Another object of the invention is the provision of a self-contained brake arrangement including a combination power cylinder-slack adjuster assembly.

A further object of the invention is the provision of a combination power cylinder-slack adjuster device wherein the slack adjuster is operated directly by the power cylinder.

A more specific object of the invention is the provision of a combination power cylinder-slack adjuster assembly all the elements of which are disposed within a common housing detachably secured to a railway vehicle frame.

These and other objects of the invention will be apparent from an examination of the following disclosure and drawings wherein:

Figure 2 is a top plan view of the structure illustrated in Figure 1.

Figure 3 is a fragmentary end elevational view with portions of the structure shown in vertical sectional view taken on line 3—3 of Figure 2.

Figure 1:
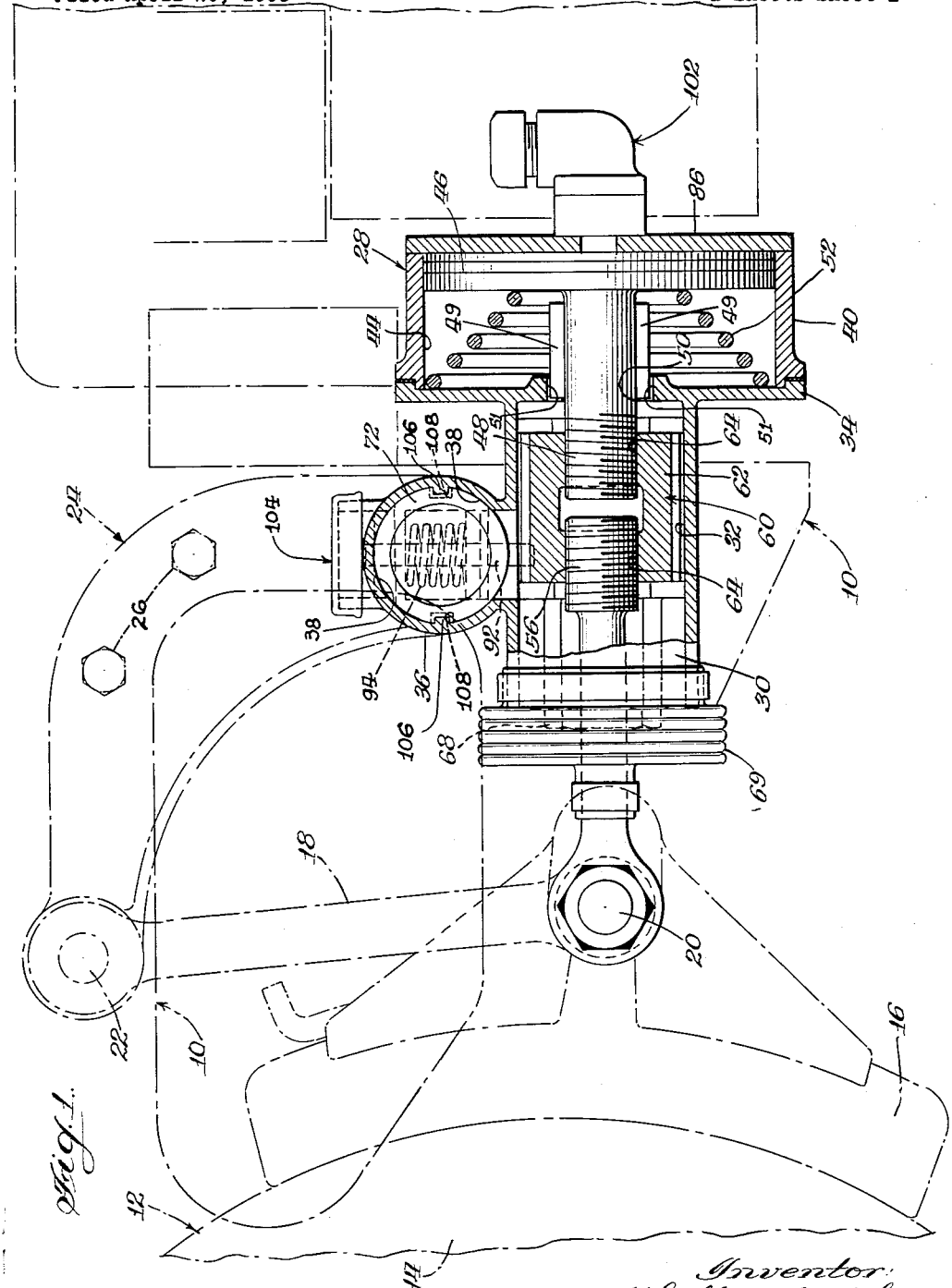
Figure 1 is a fragmenary side elevational view, partly in vertical section, of portions of a railway vehicle frame and wheel to which has been applied a unit brake arrangement embodying features of my invention.

It will be understood that certain elements have been intentionally omitted from some of the views where these elements are shown to better advantage in other views.

Referring now to the drawings for a better understanding of the invention and particularly to Figure 1, it will be seen that the novel brake actuating mechanism of the invention is shown as applied to a railway vehicle (not shown) having a frame 10 supported on a wheel and axle assembly 12 which includes a wheel 14.

Disposed adjacent wheel 14 for engagement therewith is a brake shoe assembly 16 which may be supported by a link 18 pivotally connected by pin 20 at its lower end to the brake shoe assembly and pivotally connected at its upper end by pin 22 to the car frame or preferably to the upper end of a brake arm or bracket 24 which in turn may be detachably secured to the railway car frame 10 in any desired manner, such as by a plurality of nut and bolt assemblies 26.

Secured to the bracket 24 or formed integrally therewith is a housing indicated generally at 28 comprising a generally cylindrically shaped body portion 30 defining an internal bore or ratchet chamber 32 and having adjacent one end thereof a preferably external annular flange 34 lying in a plane which intersects the longitudinal axis of chamber 32 at right angles.

Additionally, the housing 28 comprises another cylindrically shaped body portion 36 having an internal pawl chamber or bore 38 which communicates with and extends in a direction generally normal to the chamber 32.

Detachably secured to the housing flange 34 in any desired manner, as by nut and bolt assemblies 42, is a generally cup shaped power cylinder head 40. The head 40 defines with the flange 34 a power cylinder chamber 44 which is in substantial axial alignment with housing chamber 32, but which is separated from the chamber by flange 34.

Disposed within the chamber 44 is a power cylinder piston 46 having a stem or rod 48 extending therefrom through flange aperture 50 and into chamber 32 of the housing. A preferably coiled compression release spring 52 may be disposed within chamber 44 to react between piston 46 and housing flange 34.

In order to prevent rotation of rod 48 within aperture 50, the rod may be provided with a pair of radial wings or keys 49 disposed on diametrically opposed sides of the rod for sliding movement in a pair of complemental keyways or slots 51 formed in wall 34 adjacent aperture 50.

Power cylinder chamber 44 and pawl chamber 38 may be interconnected by pipe line 54 which affords an avenue of communication permitting pressure fluid to travel between the respective chambers.

As best seen in Figure 1, there is disposed within the chamber 32 a ratchet sleeve or wheel member 60 having a central cylindrically shaped body portion 62 with an internally threaded bore 64 adapted to threadably engage oppositely threaded end portions of the power cylinder piston rod 48 and of a brake rod 56 extending within chamber 32, the opposite end of the brake rod being connected by common pivotal pin 20 to brake shoe assembly 16. An outer portion of the ratchet body 62 is provided with a plurality of separated ratchet teeth 66.

Additionally, the ratchet member body 62 is provided with a hexagonal adjusting nut 68 formed integrally with or rigidly secured thereto, and disposed to extend without the chamber 32. A dust seal 69 may be provided adjacent the related end of chamber 32 to prevent dirt or other foreign matter from entering the chamber.

As best seen in Figure 3, there is disposed within the housing chamber 38, for reciprocal movement therein, a pawl carrying piston 70 comprising a body portion 72 maintained in fluid tight engagement with the walls of the housing by means of one or more spaced seals 74. Spaced axially from the body portion of the piston and connected thereto by an intermediate section 82 is a spring plate 80 against which may be disposed one end of a compression spring 84, the opposite end of which spring is disposed to abut a wall 86 at the closed end of housing chamber 38.

Still referring to Figure 3, it will be seen that intermediate section 82 of the piston body is provided with a cylindrical aperture 88 extending vertically therethrough and within which is disposed a pawl mechanism 90 comprising a plunger 92 the lower end of which is disposed to extend downwardly into housing chamber 32 for engagement with teeth 66 of ratchet sleeve 60. The plunger may be maintained in position by means of a compression spring 94 disposed to react between a horizontal wall 96 presented by the intermediate portion of the piston and a spring seat 98 on plunger 90. The wall 96 of piston 70 may be provided with a square aperture 110 to snugly slidably receive pawl plunger 92 and thereby prevent rotation of the plunger about its longitudinal axis.

Portion 36 of the housing body may be provided with an aperture 100 in order to afford access to the upper end of plunger 90. If the plunger is lifted manually and spring 94 is compressed, the ratchet member may be freely rotatably adjusted to any position. In order to prevent moisture, dirt, or other foreign matter from entering the housing, there may be provided a removable cover or cap 104 over the top of the housing above aperture 100.

To describe the operation of the device and referring first to Figure 1, it will be seen that as the power cylinder piston 46 is actuated by the admission of pressure fluid into chamber 44 through the inlet assembly indicated generally at 102, the piston and related piston rod 48 are urged to the left causing brake rod 56 to move its related brake shoe assembly 16 into engagement with wheel 14. Upon termination of the application of pressure fluid to chamber 44, release spring 52 serves to return the brake to non-applied or released position.

As wear in the lining of the brake shoe assembly and tread of the wheel occurs, it is apparent the power cylinder piston will travel beyond a predetermined distance and pressure fluid will pass from power cylinder chamber 44 through pipe line 54 and into pawl chamber 38 where it forces pawl carrying piston 70 to the right as seen in Figure 3. The device automatically compensates for wear by increasing the distance between the adjacent ends of the power cylinder piston and brake rods. When the power cylinder piston travels beyond a predetermined distance pressure fluid passes from power cylinder chamber 44 through pipe line 54 and into pawl chamber 38 where it forces pawl carrying piston 70 to the right as seen in Figure 3. As the piston moves to the right, it carries with it plunger 90, the lower end of which rides over the ratchet sleeve until it drops over the edge of one tooth 66 and engages the straight side thereof. Upon the return of piston 46 to its released position, spring 84 is free to urge piston 70 back to the left from the position illustrated in Figure 3 with the result that the plunger engaging the ratchet tooth causes the ratchet sleeve to rotate. As the sleeve rotates in threaded engagment with adjacent ends of the power cylinder piston rod and brake rod it causes the rod ends to move away from each other and thereby increases the distance therebetween.

The inner surface of the housing wall in chamber 38 may be provided with a pair of integral diametrically opposed lugs 106 which ride in complementary grooves 108 presented by piston 70 in order to prevent rotation of the piston and thereby insure proper positioning of pawl 90 at all times.

Thus, it will be seen that there is provided in the invention a self-contained brake arrangement including a combination power cylinder-slack adjuster assembly disposed within a common housing that is adapted to be readily secured to or detached from the frame adjacent the wheel and axle assembly as a self-contained brake mechanism.

I claim:

A self-contained brake arrangement for application as a unitary mechanism to a vehicle having a frame and a supporting wheel and axle assembly, comprising in combination: a brake support detachably mountable on the vehicle frame; friction means carried by the support for engagement with said assembly; and a combination fluid actuated power cylinder and automatic slack adjuster device demountably attachable to said brake support; said device including a unitary housing, a pair of axially aligned rods having at adjacent ends threaded portions disposed within the housing, the opposite ends of the rods being connected to a fluid actuated piston in the housing and to the friction means, respectively, a collar threadably engaging the threaded portions of the respective rods, and ratchet means in the housing operable to rotate the collar responsive to a predetermined movement of the piston and thereby change the distance between the rods to take up slack caused by wear of the friction means.

References Cited in the file of this patent

UNITED STATES PATENTS

| | | |
|---|---|---|
| 315,973 | Strong | Apr. 14, 1885 |
| 403,277 | Lawrence | May 14, 1889 |
| 696,521 | Wahlert | Apr. 1, 1902 |
| 1,120,640 | Adreon | Dec. 8, 1914 |
| 2,084,662 | Williamson | June 22, 1937 |
| 2,118,236 | Schwentler | May 24, 1938 |
| 2,223,043 | Miller | Nov. 26, 1940 |
| 2,382,223 | Hicks | Aug. 14, 1945 |
| 2,752,012 | Moorhead | June 26, 1956 |

OTHER REFERENCES

Publication: Railway Age, Dec. 17, 1956, page 4.